(12) United States Patent
Scilla et al.

(10) Patent No.: US 12,234,353 B2
(45) Date of Patent: Feb. 25, 2025

(54) LOW DENSITY POLYVINYL CHLORIDE MICROPARTICLES

(71) Applicant: Mexichem Specialty Resins Inc., Avon Lake, OH (US)

(72) Inventors: Christopher Scilla, Broadview Heights, OH (US); Viswanathan Narayan, Strongsville, OH (US)

(73) Assignee: Mexichem Specialty Resins Inc., Avon Lake, OH (US)

( * ) Notice: Subject to any disclaimer, the term of this patent is extended or adjusted under 35 U.S.C. 154(b) by 716 days.

(21) Appl. No.: 17/475,864

(22) Filed: Sep. 15, 2021

(65) Prior Publication Data

US 2022/0081545 A1 Mar. 17, 2022

Related U.S. Application Data

(60) Provisional application No. 63/079,930, filed on Sep. 17, 2020.

(51) Int. Cl.
| | | |
|---|---|---|
| *C08L 27/06* | (2006.01) | |
| *B01J 13/14* | (2006.01) | |
| *B01J 13/20* | (2006.01) | |

(52) U.S. Cl.
CPC .............. *C08L 27/06* (2013.01); *B01J 13/14* (2013.01); *B01J 13/206* (2013.01); *C08L 2205/20* (2013.01); *C08L 2207/32* (2013.01); *C08L 2312/02* (2013.01)

(58) Field of Classification Search
CPC .. C08L 27/06; C08L 2206/20; C08L 2207/32; C08L 2312/02; B01J 13/14; B01J 13/206
USPC ........................................................ 521/65
See application file for complete search history.

(56) References Cited

U.S. PATENT DOCUMENTS

| | | |
|---|---|---|
| 4,448,738 A | 5/1984 | Crocker et al. |
| 4,902,721 A | 2/1990 | Pham et al. |
| 4,917,857 A | 4/1990 | Jaeckel et al. |
| 5,086,084 A | 2/1992 | Michaelson |
| 7,601,762 B2 | 10/2009 | Clatty et al. |
| 9,000,060 B2 | 4/2015 | Shima |
| 9,249,283 B2 | 2/2016 | Keikkila et al. |
| 9,365,692 B2 | 6/2016 | Schofalvi et al. |
| 9,487,651 B2 | 11/2016 | Lee et al. |
| 10,227,490 B2 | 3/2019 | Heikkila et al. |
| 10,493,732 B2 | 12/2019 | Bankenhagen et al. |
| 10,508,187 B2 | 12/2019 | Heikkila et al. |
| 2003/0225173 A1 | 12/2003 | Albright et al. |
| 2008/0182019 A1 | 7/2008 | Retter et al. |
| 2008/0182056 A1 | 7/2008 | Bakker et al. |
| 2012/0237606 A1 | 9/2012 | Wellings |
| 2016/0067276 A1 | 3/2016 | Polizzotti et al. |
| 2018/0066131 A1 | 3/2018 | Jin et al. |
| 2019/0077925 A1 | 3/2019 | Srinivas et al. |
| 2019/0177502 A1 | 6/2019 | Hurley |

FOREIGN PATENT DOCUMENTS

| | | | |
|---|---|---|---|
| EP | 3858921 A1 | | 8/2021 |
| EP | 3858922 A1 | | 8/2021 |
| JP | 06271605 A | * | 9/1994 |
| JP | H 6271605 A | | 9/1994 |
| JP | 2006-291090 A | | 10/2006 |
| JP | 2011102378 A | * | 5/2011 |
| JP | 2012072257 A | * | 4/2012 |
| JP | 5559585 B2 | | 7/2014 |
| JP | 5680924 B2 | | 3/2015 |
| WO | WO 2020/066704 A1 | | 4/2020 |
| WO | WO 2020/066705 A1 | | 4/2020 |

OTHER PUBLICATIONS

Thompson Scientific, London, GB Database WPI Week 199443, 1994-347147 (Year: 1994).*
Gao et al. "Double Emulsion Templated Microcapsules with Single Hollow Cavities and Thickness-Controllable Shells", Langmuir, vol. 25, No. 6 (2009), pp. 3832-3838 (Year: 2009).*
3M Glass Bubbles Start something big, by thinking small (2018), 3M Advanced Materials Division, St. Paul, MN 55144 USA www.3M.com/glassbubbles.
Gao, Fei et al., "Double Emulsion Templated Microcapsules with Single Hollow Cavities and Thickness-Controllable Shells," Langmuir 2009, vol. 25 No. 6, pp. 3832-3838.
International Search Report of International Application PCT/JP2019/036155 dated Sep. 13, 2019, 4 pages.
International Search Report of International Application PCT/US2021/050469 dated Dec. 23, 2021.
Mexichem, Vestolit G 215 Blending Resin (210 Series), Mar. 2016, 2 pages.
Synthomer, Technical Data Sheet, Alcotex 72.5, Application Advice & Processing, 2 pgs.
Technical Information, Petrochemicals, Plastomoll® DNA, Plasticizer for PVC products with good low-temperature properties, Feb. 2015, BASF SE, Operating Division Petrochemicals, Ludwigshafen, Germany http://www.plasticizers.basf.com.
What are Expancel Microspheres; Expancel Expandable Microspheres, The world's favorite secret ingredient (2020), 5 pgs. Nouryon; https://www.nouryon.com.
Written Opinion of the International Searching Authority of International Application PCT/JP2019/036155 dated Dec. 12, 2019.
Written Opinion of the International Searching Authority of International Application PCT/US2021/050469 dated Dec. 23, 2021.

* cited by examiner

*Primary Examiner* — Michael M. Bernshteyn
(74) *Attorney, Agent, or Firm* — Crowell & Morning LLP

(57) ABSTRACT

Hollow microparticles of polyvinyl chloride are disclosed, having low volumetric densities useful for reducing mass per unit volume of polymer or inorganic articles and apparatus having such microparticles compounded into thermoplastic or thermoset polymers. A double emulsion polymerization process is also disclosed as the process to produce the hollow microparticles.

18 Claims, 1 Drawing Sheet

LOW DENSITY POLYVINYL CHLORIDE MICROPARTICLES

CROSS-REFERENCE OF RELATED APPLICATIONS

This application claims the benefit of U.S. provisional application No. 63/079,930, filed on Sep. 17, 2020, which is incorporated by reference herein in its entirety.

FIELD OF THE INVENTION

This invention relates to low density microparticles comprising polyvinyl chloride.

BACKGROUND OF THE INVENTION

The world of polymers has progressed rapidly to transform material science from wood and metals of the 19$^{th}$ Century to the use of thermoset polymers of the mid-20$^{th}$ Century to the use of thermoplastic polymers of later 20$^{th}$ Century. Unlike glass, wood, or metal, thermoplastic polymer compounds do not shatter, decay, or rust.

Polymer compounds such as paint, caulks, adhesives, sealants, and coatings among others have become quite useful for a number of industries, including without limitation transportation; construction; and commercial and consumer products such as insulation and jacketing of wire and cables containing electrical or optical conductors.

One advantage polymeric compounds have over many of the competitive materials is that polymeric compounds possess a lower density. This allows for the formation of lighter articles. Weight reduction is an important trend in many industries for economic and environmental reasons. For example, in the transport industry, reduced vehicle weight means less energy is required to transport goods, people, etc.

Replacing metals with engineered plastics for weight reduction of engineered components and assembled articles like automobiles, planes, etc is a well-known and accepted practice for the past several decades. Advances in these plastics have also achieved further mechanical strength improvements that can now match or even exceed the same component made with metals.

Even within the realm of plastics, there are publications that claim weight reductions of the same components without loss in mechanical properties.

Several "light-weighting" efforts in polymer compounds commercially have resulted from the use of hollow glass microspheres (also called glass microbeads).

Glass microspheres have been known for many years, as is shown by European Patent 0 091,555, and U.S. Pat. Nos. 2,978,340, 3,030,215, 3,129,086 3,230,064, and 2,978,340, all of which teach a process of manufacture involving simultaneous fusion of the glass-forming components and expansion of the fused mass. U.S. Pat. No. 3,365,315 (Beck), U.S. Pat. No. 4,279,632 (Howell), U.S. Pat. No. 4,391,646 (Howell) and U.S. Pat. No. 4,767,726 (Marshall) teach an alternate process involving heating a glass composition containing an inorganic gas forming agent, and heating the glass to a temperature sufficient to liberate the gas and at which the glass has viscosity of less than about 104 poise.

A useful summary about glass microspheres can be found in United States Patent Application Publication No. US 2007/0012351 (Horemans) and assigned to 3M Company, a sophisticated user of glass microspheres for a variety of films, adhesives, reflective articles, etc.

As useful as hollow glass microspheres have been in use with polymers, glass microspheres have deficiencies. Among those deficiencies are: (a) higher material cost of special ceramics vs. polymerics and (b) less polymer-to-filler compatibility when forming the discontinuous phase of microparticles in the ceramic vs. polymeric continuous phase of the final compound for shaping into the polymer article or apparatus.

Another technology is the Expancel™ product line of filler/blowing agents which, upon application of heat, convert 12 micrometer diameter microparticles having a 2 micrometer polymeric shell with hydrocarbon contained therein to 40 micrometer diameter microparticles having a 0.1 micrometer polymeric shell. The Expancel™ product line is commercially available from Nouryon of Marietta, Ga.

SUMMARY OF THE INVENTION

What the art needs is a polymer resin or polymer compound to be formed into hollow polymeric microparticles, in replacement of hollow ceramic microspheres.

This replacement would provide the following advantages or solutions to the problem of using hollow glass microspheres: (a) less material cost product, (b) potentially lower density of the polymeric particles meaning that equal density reduction effect can be had using less material, (c) better compatibility of the polymer with the matrix material leading to better dispersity and mechanical properties, (d) better durability of the composite, (e) increased water and stain resistance over the glass microspheres.

It has been found possible to form hollow polymeric microparticles using a double emulsion polymerization process of polyvinyl chloride. Briefly, the double emulsion polymerization process comprises (a) forming an intermediate water-in-oil emulsion having a discontinuous phase of alkaline water in a continuous phase of vinyl chloride monomer and lipophilic surfactant(s) and initiator(s) and optionally crosslinker(s), (b) mixing the intermediate premixed water-in-oil emulsion into an aqueous phase, optionally alkaline, containing hydrophilic surfactants, such that the intermediate premixed water-in-oil emulsion becomes a discontinuous oil phase in the aqueous phase, (c) ripening via agitation the double emulsion to form microparticles having a monomeric polyvinyl chloride shell and an aqueous core, (d) polymerizing with the addition of crosslinker(s) if not added in step (a) the polyvinyl chloride shell, and (e) drying the microparticles to remove water from the core of the microparticles.

The resulting hollow polymeric microparticles, preferably spherical or nearly spherical, can be either (a) mixed into other polymer(s) serving as carriers in a concentrated manner to be used as a masterbatch for subsequent dispersion (commonly called "letdown") into other polymer(s) or (b) mixed into other polymer(s) serving as polymer matrix to be used as a compound. Regardless of pathway of usage, the hollow polymeric microparticles, once dispersed into other polymer(s) are able to reduce the overall density of the resulting polymer article or apparatus.

Briefly, "volumetric density" as used herein is the mass of a sample of particulate solid divided by the volume of that sample in a well compacted condition and reported as g/cm$^3$. Briefly, "Dn average particle size" as used herein is the number average particle size calculated from the particle size distribution of a sample of particulate solid measured in micrometers using a Nanotrac Flex particle size analyzer sold by Microtrac MRB of Montgomeryville, PA. Other equivalent instruments may be used.

One aspect of the invention is a composition of matter comprising hollow microparticles with a Dn average particle size in their largest dimension ranging from about 15 to about 200 micrometers comprising polyvinyl chloride and having a volumetric density of less than about 0.6 g/cm$^3$.

Another aspect of the invention is a polymer mixture of hollow microparticles described above dispersed in at least one other polymeric or inorganic matrix.

Another aspect of the invention is an article or apparatus comprising the mixture described above.

Another aspect of the invention is a process of making the hollow microparticles described above using a double emulsion polymerization process.

Using this document and without undue experimentation, a person having ordinary skill in the art can formulate a compound that utilizes the hollow polyvinyl chloride microparticles to reduce the overall density of that compound within a given volume, in order to reduce the overall mass of the entire article or apparatus or any designated portion thereof.

Other aspects of the invention and attributes and advantages of hollow polyvinyl chloride microparticles will become apparent below.

EMBODIMENTS OF THE INVENTION

Monomers to Form Polyvinyl Chlorides

Figure 1:
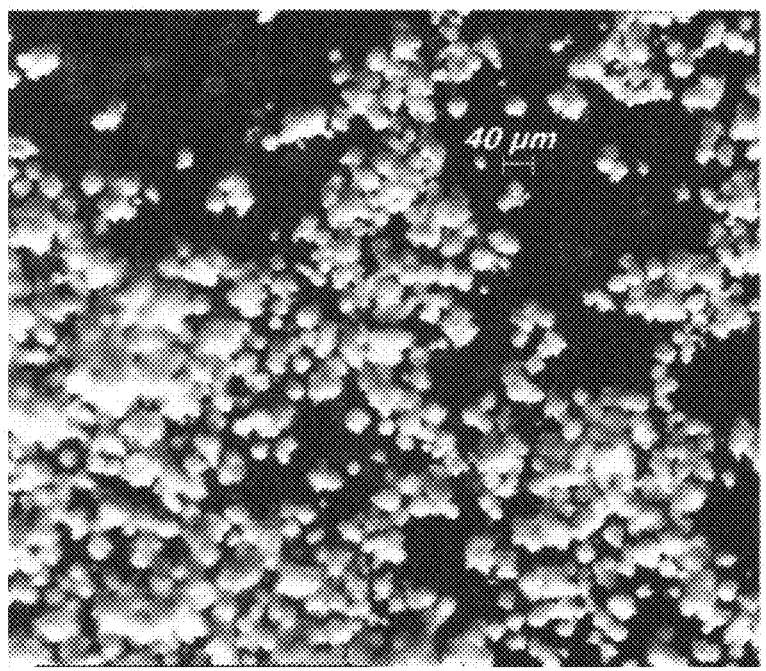
FIG. 1 is a microphotograph of hollow polyvinyl chloride microparticles of Example 8.

Polyvinyl chlorides are essentially homopolymers or copolymers of vinyl chloride monomer, with minor amounts of other co-monomers, if any. Polyvinyl chloride (PVC) is one of most common types of thermoplastic polymer used from the mid-20$^{th}$ Century to the present. Polyvinyl chlorides are advantageous because they have inherent flame retardant properties arising from the presence of chloride moieties which naturally retard onset and continuity of combustion in the presence of oxygen.

PVC comprises polymerized vinyl chloride monomer where preferred polymers are essentially homopolymerized vinyl chloride with little or no copolymerized co-monomers. Useful co-monomers, if desired, include mono-unsaturated ethylenically unsaturated monomer copolymerizable with vinyl chloride monomer by addition polymerization. Useful co-monomers include other vinyl monomers such as vinyl acetate, ethers, and vinylidene chloride. Other useful co-monomers comprise mono-ethylenically unsaturated monomers including acrylics such as lower alkyl acrylates or methacrylates, acrylic and methacrylic acid, lower alkenyl olefins, vinyl aromatics such as styrene and styrene derivatives, and vinyl esters and ethers. Typical useful commercial co-monomers include acrylonitrile, 2-ethylhexyl acrylate, vinylidene chloride, and isobutyl ether. Useful PVC copolymers can contain from about 0.1% to about 10% or 15%, preferably from about 0.5% to about 5%, by weight of copolymerized co-monomer.

Vinyl chloride monomer is commercially available from Occidental Chemicals among other suppliers such as Westlake Chemicals and Olin Chlor Alkali. All of the useful co-monomers identified above are well known chemicals, commercially available from MilliporeSigma of St. Louis, Mo. or other chemical supply distributors.

Preferred PVCs to be polymerized for this invention are suspension polymerized vinyl chloride. Rigid PVCs are distinguished from flexible PVCs in that former contain essentially no plasticizer. But the grade of PVC for use as a light-weighting component in a polymeric article or apparatus has particular requirements other than merely the presence or absence of plasticizer or inherency of flame retardant properties.

Crosslinker

Any crosslinker which is used for the crosslinking of vinyl chlorides is a candidate for use in this invention to crosslink the vinyl chloride(s) during the double emulsion polymerization process.

Non-limiting examples of crosslinking agents for vinyl chloride monomers can include diallyl phthalate, butanediol diacrylate, ethylene glycol dimethacrylate, methylene bisacrylamide, tracrylyl triazine, divinyl ether, allyl silanes and the like; and including mixtures of any of the these comonomers. In the double emulsion polymerization process, depending on the type of crosslinker, the crosslinker can be added to (a) the premix ingredients or (b) the reactor ingredients.

Hydrophilic Surfactants for Polymerization

Any hydrophilic surfactant (also called a suspension agent) which is used for the assistance in the suspension polymerization of vinyl chlorides is a candidate for use in this invention to generate a continuous phase and a dispersed phase during the double emulsion polymerization process.

Non-limiting examples of surfactants for vinyl chloride monomers can include high molecular weight polyvinyl alcohol (PVOH) of various hydrolysis levels; sodium lauryl sulfate, alpha olefin sulfonates, ammonium laurate, and combinations thereof.

Lipophilic Surfactants for Forming a Water-in-Oil Emulsion Intermediate

Also needed for use in this invention is a lipophilic surfactant to stabilize the "inner" water-in-oil emulsion made during the premixing step of the double emulsion polymerization process. These lipophilic surfactants should have a value of about 3 to about 6 on the hydrophilic-lipophilic balance scale.

This scale was described in the following publications: Griffin, Journal of the Society of Cosmetic Chemists, 1(5), 311. Griffin, Journal of the Society of Cosmetic Chemists 5(4), 249, and Davies Gas/Liquid and Liquid/Liquid Interface, Proceedings of the International Congress of Surface Activity, 426.

Non-limiting examples of lipophilic surfactants suitable for use in this invention include epoxidized soybean oil, di-(isononyl) adipate, sorbitan monooleate, sorbitan monolaurate, sorbitan stearate, sorbitan trioleate, sorbitan tristearate, and combinations thereof.

Initiator

Any initiator which is used to commence suspension polymerization of vinyl chlorides is a candidate for use in this invention to generate the solid polymeric shell during the polymerization step in the process.

Non-limiting examples of initiators for vinyl chloride monomers can include oil soluble peroxides, such as di(2-ethylhexyl) peroxydicarbonate and lauroyl peroxide; dibenzoyl peroxide, Di(4-tert-butylcyclohexyl) peroxydicarbonate, cumyl peroxyneodecanoate, and di-sec-butyl peroxydicarbonate. Also suitable are oil soluble azo compounds including, but not limited to 2,2'-Azodi(2-methylbutyronitrile), 1,1-azodi(hexahydrobenzonitrile), 2,2'-azodi(2-methylbutyronitrile), azobisisobutyronitrile; and combinations thereof.

Table 1 shows acceptable, desirable, and preferable ranges of desirable ingredients useful in the present invention, all expressed in parts per hundred of monomer (PHR), separated into a premix quantity and a reactor quantity according to the double emulsion polymerization process described above and in greater detail below.

The polymerization charges into premix and reactor can comprise, consist essentially of, or consist of these ingredients. Any number between the ends of the ranges is also contemplated as an end of a range, such that all possible combinations are contemplated within the possibilities of Table 1 as embodiments of polymerization ingredients for use in the disclosed invention. Unless expressly stated otherwise herein, any disclosed number is intended to refer to both exactly the disclosed number and "about" the disclosed number, such that either possibility is contemplated within the possibilities of Table 1 as embodiments of the polymerization charges for use in the disclosed invention. The crosslinker can alternatively be added to the premix container or the reactor and occupies its own category in Table 1. It is also contemplated that crosslinker(s) could be added to both the premix container and the reactor.

organic phase particles. In such double emulsified condition, the monomer is polymerized in aqueous suspension to form particles having a polymeric shell and a water core within the shell. After drying to remove essentially all of the water, the polymerized particles are rendered hollow to produce useful polyvinyl chloride microparticles having a low volumetric density of between about 0.2 and about 0.6 g/cm$^3$ and a Dn average particle size in their largest dimension of about 15 to about 200 micrometers. The Dn average particle size in their largest dimension may be at least about 22 micrometers, or at least about 30 micrometers, or at most about 150 micrometers.

The process of this invention differs from GAO, et al. "Double Emulsion Templated Microcapsules with Single Hollow Cavities and Thickness-Controllable Shells" *Langmuir* 2009, 25, 3832-3838 at least for the reasons that the process of this invention uses different monomers, surfactants, initiators, and different reaction conditions, especially the use of homogenization in the premix step and thermal initiation in the polymerization, as compared with Gao which discloses light activated initiation.

The process of this invention also differs from JP5680924 (B2) and JP5559585 (B2) because both Japanese patents do not utilize the water-in-oil emulsion premixture to establish the hydrophilic dispersed phase in the continuous phase containing vinyl chloride monomer.

TABLE 1

| Ingredients | (PHR) | | |
|---|---|---|---|
| | Acceptable | Desirable | Preferred |
| Premix Container | | | |
| Vinyl Chloride Monomer | 90-100 | 93-98 | 96-98 |
| Peroxide Initiator(s) | 0.05-0.2 | 0.05-0.18 | 0.05-0.10 |
| Epoxidized Oil Lipophilic Surfactant | 0.4-0.5 | 0.41-0.43 | 0.425 |
| Adipate Lipophilic Surfactant | 0.4-1.1 | 0.7-1.0 | 0.5-1.0 |
| Other Additives | 0-10 | 0-5 | 0 |
| Demineralized Water | 10-20 | 12-17 | 15 |
| NaOH | 0.01-0.07 | 0.04-0.07 | 0.027-0.07 |
| Reactor | | | |
| PVOH Hydrophilic Surfactant(s) | 1.7-3.2 | 1.82-3.0 | 1.87-2.86 |
| Demineralized Water | 120-150 | 130-140 | 135 |
| Injection Water | 20-30 | 22-27 | 25 |
| NaOH | 0-0.0270 | 0-0.027 | 0 |
| Anti-Foaming Agent | 0-0.3 | 0.05-2.25 | 0.1-0.2 |
| Crosslinker Addition in the Alternative or Both* | | | |
| Added at Premix Container | 0-10 | 0-4 | 0-4 |
| Added at Reactor | 0-5 | 0-3 | 0-2 |

*The amount of crosslinker overall ranges from 2-10 PHR.

Polymerization of Vinyl Chloride Monomers

This invention uses a double emulsion polymerization process to make hollow polyvinyl chloride microparticles. The microparticles have a polyvinyl chloride shell and a hollow core because of the particular double emulsion polymerization process used.

Generally, the process involves (a) premixing of all ingredients identified in Table 1 in the Premix Container section and optionally the crosslinker separately identified in Table 1 to achieve homogenization of the first emulsion, then (b) charging of the homogenized premixed ingredients to a stirred solution of the hydrophilic surfactants in water to make a mixture having a continuous water phase and a discontinuous organic phase of particles with dispersed water phase regions discontinuously trapped within the The process of this invention also differs from WO2020066704 and WO2020066705 for the same reason and especially does not use a hydrocarbon solvent as required by these PCT patent publications. Also, the particles have a size less than 20 micrometers. Thus, microparticles of this invention are free of use of hydrocarbon solvent and are larger than the particles disclosed in these two PCT patent publications.

Premix Steps

In general, for an embodiment using vinyl chloride monomer and the acceptable PHR ranges for ingredients seen in Table 1, one embodiment of the process for making the hollow PVC particles is as follows. First, vinyl chloride monomer is added to a mixture of (a) water, (b) a lipophilic surfactant system of a combination of epoxidized soybean oil and adipate plasticizer, (c) an oil soluble peroxide initiator, and optionally sodium hydroxide to make the pH of the premix slightly alkaline. In this embodiment, the crosslinker is added during this step instead of being metered into the reactor in a later step. Prior to the vinyl chloride addition, the vessel is purged of atmospheric oxygen by first putting the vessel under 27 inches (69 cm) of Hg of vacuum and then adding pure nitrogen to bring the vessel back to atmospheric pressure. This process is repeated twice before vinyl chloride monomer addition. This aqueous mixture sometimes is collectively referred to as the "inner" water phase. The combined monomer/inner water phase mixture is homogenized through a high shear mixer for about 18 minutes to create a water-in-oil suspension intermediate.

Reactor Polymerization

The premix suspension intermediate, a water-in-oil emulsion, is transferred to the polymerization vessel which contains a previously charged mixture of water, and a hydrophilic surfactant system, in this embodiment a mixture of 2 grades of poly(vinyl alcohol). The reactor undergoes one purge cycle of vacuum and nitrogen as described above prior to this addition. The combined mixture is stirred at about 325-500 rpm at room temperature for about 30 to about 140 minutes, a so-called "Ripening Time" to permit the water-in-oil emulsion of the intermediate to emulsify into the continuous aqueous phase. The mixture may also be stirred at about 375-425 rpm, or for about 50 to about 120 minutes. After this Ripening Time, the reactor is heated to the reaction temperature of 120-145° F. (49-63° C.), or 125-140° F. (52-60° C.), or 125-135° F. (52-57° C.). Stirring is maintained during the polymerization, and also, if the embodiment has not added the crosslinker previously, the crosslinker co-monomer with two sites of unsaturation is slowly metered into the reaction mixture. To account for the higher density of the polymerized monomer, "injection" water is slowly added to the reaction mixture to keep constant the overall volume of material in the reactor. The polymerization continues until the pressure inside the reactor has dropped by 10 to 25 lbs (0.69-1.72 bar) or after 10-15 hours, whichever is shorter. The reaction is halted by cooling the mixture down and removing any excess vinyl chloride monomer via vacuum. During this cool down step in the process, antifoaming agents can be added to prevent loss to the vacuum system. The resulting solid/liquid slurry is filtered, washed with water and dried in a spray or fluid bed dryer. It has been found in the results of the examples that the resulting solid shell—hollow core microparticles can have a measured volumetric density of about 0.20-0.39 $g/cm^3$.

Polyvinyl Chloride Microparticles

Useful polyvinyl microparticles polymerized according to the double emulsion process described above have excellent low volumetric density and other physical properties.

The PVCs can have a volumetric density ranging from about 0.2 or less to less than about 0.6 $g/cm^3$, desirably from about 0.2 or less to about 0.5 $g/cm^3$, and preferably from about 0.2 or less to about 0.39 $g/cm^3$. Most preferably, the volumetric density can be tuned within these ranges, by a person having ordinary skill in the art without undue experimentation, for a variety of applications, all as measured via comparison of the mass and volume of a well compacted sample of particles.

Further embodiments of the invention are explained in the following examples.

EXAMPLES

Volumetric Density

The method for measurement of volumetric density was as follows: A known mass of polymeric powder was added to a graduated cylinder. The powder was compacted by repeatedly tapping the cylinder on a hard surface for 5 minutes at a taping rate of approximately 1 tap per second. After the mass was compacted, the volume of the sample was read from the graduated cylinder. The volumetric density reported in $g/cm^3$ was the mass of the sample divided by the volume of the sample.

Tables 2 and 3 show the ingredients for Examples 1-8 and their commercial sources, formulations for each Example, processing conditions, and polymerization results for each Example.

TABLE 2

| Examples | 1 | 2 | 3 | 4 |
|---|---|---|---|---|
| Premix Ingredients (PHR) | | | | |
| Vinyl Halide Monomer (Occidental) | 96.0 | 96.0 | 96.0 | 90.0 |
| Demineralized Water | 15.0 | 15.0 | 15.0 | 15.0 |
| PlasChek ™ 775 Epoxidized Soybean Oil Lipophilic Surfactant (Valerus) | 0.425 | 0.425 | 0.425 | 0.425 |
| Plastomoll ™ DNA Adipate Lipophilic Surfactant (BASF) | 1.00 | 0.50 | 0.75 | 0.50 |
| TRIGONOX ™ EHP Di(2-ethylhexyl) peroxydicarbonate Peroxide Initiator (Nouryon) | 0.050 | 0.050 | 0.050 | 0.080 |
| Laurox ™ Lauroyl Peroxide Initiator (Nouryon) | | | | |
| NaOH | 0.070 | 0.010 | 0.040 | 0.010 |
| Reactor Ingredients (PHR) | | | | |
| Demineralized Water | 135.0 | 135.0 | 135.0 | 135.0 |
| Injection Water | 25.0 | 25.0 | 25.0 | 25.0 |
| Alcotex ™ 8847 PVOH/Polyvinyl Acetate Surfactant (Synthomer) (80% Hydrolysis) | 1.474 | 2.258 | 1.866 | 1.4746 |
| Alcotex ™ 72.5 PVOH | 0.406 | 0.622 | 0.514 | 0.4068 |

TABLE 2-continued

| Examples | 1 | 2 | 3 | 4 |
|---|---|---|---|---|
| Surfactant (Synthomer) (72.5% Hydrolysis) NaOH | | | | 0.027 |
| DrewPlus L-140 Anti-Foaming Agent (Ashland) | 0.10 | 0.10 | 0.10 | 0.10 |
| Crosslinker Alternatives | | | | |
| Monoplex ™ Diallyl Phthalate Crosslinker Added as a Premix Ingredient (Hallstar) | 4.00 | 4.00 | 4.00 | 10.00 |
| Butanediol Diacrylate Crosslinker Added as a Reactor Ingredient (Sigma Aldrich) | | | | |
| Reaction Conditions | | | | |
| Ripening Time (Min.) | 60 | 120 | 90 | 60 |
| Reaction Temperature (° F.) | 125 | 125 | 125 | 135 |
| Reactor Agitation (RPM) | 375 | 375 | 375 | 325 |
| End of Reaction (whichever comes first) | 60# Drop or 10 Hrs. | 60# Drop or 10 Hrs. | 60# Drop or 10 Hrs. | 25# Drop or 10 Hrs. |
| Reactor Loading (%) | 90 | 90 | 90 | 90 |
| Properties | | | | |
| Volumetric Density (g/cm$^3$) | 0.23 | 0.27 | 0.27 | 0.38 |
| Dn Average Particle Size using a Nanotrac Flex particle size analyzer (Averaged diameter of each particle) (micrometers) | 34 | 23 | 22 | 22 |

TABLE 3

| Examples | 5 | 6 | 7 | 8 |
|---|---|---|---|---|
| Premix Ingredients (PHR) | | | | |
| Vinyl Halide Monomer (Occidental) | 96.0 | 96.0 | 96.0 | 98.0 |
| Demineralized Water | 15.0 | 15.0 | 15.0 | 15.0 |
| PlasChek ™ 775 Epoxidized Soybean Oil Lipophilic Surfactant (Valerus) | 0.425 | 0.425 | 0.425 | 0.425 |
| Plastomoll ™ DNA Adipate Lipophilic Surfactant (BASF) | 1.00 | 1.00 | 1.00 | 1.00 |
| TRIGONOX ™ EHP Di(2-ethylhexyl) peroxydicarbonate Peroxide Initiator (Nouryon) | 0.050 | 0.050 | 0.050 | |
| Laurox ™ Lauroyl Peroxide Initiator (Nouryon) | | 0.050 | 0.050 | 0.181 |
| NaOH | 0.070 | 0.070 | 0.070 | 0.070 |
| Reactor Ingredients (PHR) | | | | |
| Demineralized Water | 135.0 | 135.0 | 135.0 | 135.0 |
| Injection Water | 25.0 | 25.0 | 25.0 | 25.0 |
| Alcotex ™ 8847 PVOH/Polyvinyl Acetate Surfactant (Synthomer) (80% Hydrolysis) | 1.474 | 1.474 | 1.474 | 1.474 |
| Alcotex ™ 72.5 PVOH Surfactant (Synthomer) (72.5% Hydrolysis) NaOH | 0.406 | 0.406 | 0.406 | 0.406 |
| DrewPlus L-140 Anti-Foaming Agent (Ashland) | 0.20 | 0.20 | 0.20 | 0.20 |
| Crosslinker Alternatives | | | | |
| Monoplex ™ Diallyl Phthalate Crosslinker Added as a Premix Ingredient (Hallstar) | 4.00 | 4.00 | 4.00 | |
| Butanediol Diacrylate | | | | 2.00 |

TABLE 3-continued

| Examples | 5 | 6 | 7 | 8 |
|---|---|---|---|---|
| Crosslinker Added as a Reactor Ingredient (Sigma Aldrich) | | | | |
| Reaction Conditions | | | | |
| Ripening Time (Min.) | 60 | 60 | 60 | 60 |
| Reaction Temperature (° F.) | 125 | 130 | 130 | 140 |
| Reactor Agitation (RPM) | 375 | 375 | 425 | 425 |
| End of Reaction (whichever comes first) | 20# Drop or 15 Hrs. | 10# Drop or 10 Hrs. | 10# Drop or 10 Hrs. | 30# Drop or 10 Hrs. |
| Reactor Loading (%) | 90 | 90 | 90 | 80 |
| Properties | | | | |
| Volumetric Density (g/cm$^3$) | 0.28 | 0.31 | 0.34 | 0.39 |
| Dn Average Particle Size using a Nanotrac Flex particle size analyzer (Averaged diameter of each particle) (micrometers) | 71 | | 50 | 58 |

The following premixing steps and reactor steps were used for Examples 1-8. To the extent that there are variables in the processing conditions, they are identified in Tables 2 and 3 above.

The Examples 1-8 were prepared according to the following steps.

Preparation of Premix

The premix used a Model 141740 container sold by WSF Industries. Some of the demineralized water was charged into the container and agitation was started. Separately, the NaOH used in the premix was dissolved in some more of the demineralized water to render the liquid slightly alkaline before addition to the premix. ESO and adipate lipophilic surfactants were charged, along with the diallyl phthalate crosslinker for Examples 1-7. For Example 8, no crosslinker was added to the premix. The premix was cooled to 70° F. (21° C.). Then the peroxide initiator(s) were charged, and the addition vessel was flushed with some more of the demineralized water. Then, the premix chamber was sealed, and placed under a vacuum of 27 inches (69 cm) of mercury. Once the desired vacuum was reached, the pressure in the vessel was returned to atmospheric via the addition of nitrogen gas. This vacuum/nitrogen cycle was repeated to ensure minimal oxygen levels within the premix chamber. Then, the agitation was halted, and the vinyl chloride monomer was charged. The resulting mixture was agitated at 400 RPM for 15 minutes.

Combining Reactor Ingredients Other Than Pre-Mix

The reactor used was a custom WSF Industries 13.5 gallon (51 liter) reactor The demineralized water was charged, followed by charging the two hydrophilic surfactants sequentially. Then for Example 3 only, the NaOH was added to demineralized water and the resulting solution was charged into the reactor. The reactor was then evacuated to a vacuum of 27 inches (69 cm) of mercury. Then, the safety valve was opened to break the reactor back to ambient pressure in a nitrogen atmosphere. Then, the contents of the reactor were agitated for 45 minutes at an RPM identified in Tables 2 and 3 as "Variable Reactor Agitation".

Homogenization of Premix and Transfer to Reactor

With agitation stopped, a Tekmar DR3-6/6-P homogenizer was used to recycle the premix for 18 minutes at 3521 rpm. Then, with the agitation off, the contents of the premix chamber were transferred to the reactor using a nitrogen pressure of 63 PSIG (434 kPa) and joined with the reactor ingredients. The reactor was agitated at the same rate for a duration identified in Tables 2 and 3 as "Ripening Time."

Polymerization to Form Hollow PVC Microparticles

The reactor was heated to a Reaction Temperature identified in Tables 2 and 3. Then from that "zero hour", demineralized water was injected for 10 hours at a rate of 417 ml/hr into the reactor for all Examples, except Example 4 which was 382 ml/hr. For Example 8 only, the butanediol diacrylate crosslinker was added at a rate of 40 ml/hr beginning one hour after "zero hour." For all Examples, when the pressure dropped to the amount identified in Tables 2 and 3 or the number of hours identified also in Tables 2 and 3, whichever came first was reached, the agitation was reduced to 100 RPM. Then, the defoaming agent was added and flushed with additional demineralized water. Unreacted monomer was removed from the reactor by venting using vacuum. With venting open, the reactor was allowed to cool to ambient temperature. Once the pressure in the reactor reaches 0 PSIG (0 kPa) the reactor was heated to 170° F. (77° C.) and vacuum was continued for 3 hours. The resulting slurry was cooled, filtered and washed three times with demineralized water to obtain the wetcake.

Once obtained, the wetcake was dried either in a Sherwood Scientific M501 fluid bed dryer for several hours or in a Bowen spray dryer. For the spray drying, 4 lbs (1.81 kg) of the wet cake was first thoroughly mixed into 8 lbs (3.63 kg) of water. The resulting slurry was fed through the spray dryer at a rate of 15 lbs/hr (6.80 kg) with a chamber temperature of 150° F. (66° C.) and a nozzle pressure of 45 PSIG (310 kg). The product was obtained as a dry powder of hollow PVC microspheres from either of these methods.

FIG. 1 is microphotograph of hollow polyvinyl chloride microparticles prepared according to Example 8. The resolution of the photograph identifies a distance of 40 micrometers.

Polymer Compounds Using Low Volumetric Density Polyvinyl Chloride Microparticles Once the low volumetric density polyvinyl chloride hollow microparticles are made, they become very useful as a functional additive in a polymer compound having a polymer resin as a matrix and optionally other functional additives and colorants useful for any conceivable industry seeking a lower specific gravity polymeric article or apparatus.

In an embodiment, the microparticles comprise a thin, non-porous, shell of crosslinked PVC surrounding a hollow core cavity. When mixed into a formulation with other polymer(s) or inorganic compounds (such as cement) serving as a continuous phase matrix, the PVC shell excludes the matrix polymer(s), resulting in the formation of hollow voids in the final polymer article, reducing the total mass per given volume of the article.

Figure 2:
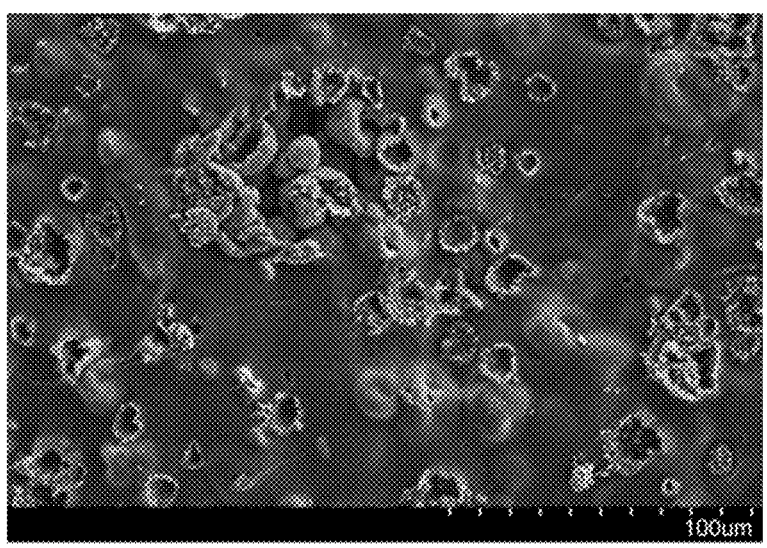
FIG. 2 is a scanning electron microscope cross-sectional image of hollow polyvinyl chloride microparticles of Example 1 dispersed into a matrix of another polymer.

FIG. 2 is a SEM cross-section of low volumetric density PVC microparticles as a discrete phase in matrix of wood glue as the continuous phase. The core/shell morphology of the microparticles is easily identified for those microparticles which were sheared to expose their hollow cores.

Any thermoplastic or thermoset polymer is a candidate for use with the hollow microparticles according to the selection by a person having ordinary skill in the art for the purpose of specific physical or chemical properties imparted to the polymeric article or apparatus.

Non-limited examples of thermoplastic polymers include (a) polyvinyl chlorides described above having different physical properties; (b) polyamides; (c) polyolefins; (d) polyurethanes; (e) polyacrylates; (f) polycarbonates; (g) polystyrenes; and (h) polyvinylidene fluoride. Combinations of any two or more thermoplastic polymers are also suitable for matrices including the hollow polyvinyl chloride microparticles.

Non-limiting examples of thermoset polymers include vulcanizable rubbers; epoxies; polyurethanes; and polyesters.

Functional additives for thermoplastic or thermoset polymers or both are also well known to the person having ordinary skill in the art. Non-limiting examples of such additives include adhesion promoters; biocides (antibacterials, fungicides, and mildewcides), anti-fogging agents; anti-static agents; bonding, blowing and foaming agents; colorants, dyes, and pigments; dispersants; fillers and extenders; fire and flame retardants and smoke suppressants; impact modifiers; initiators; lubricants; micas; plasticizers; processing aids; release agents; silanes, titanates and zirconates; slip and anti-blocking agents; stabilizers; stearates; ultraviolet light absorbers; viscosity regulators; waxes; and combinations of them.

Hollow polyvinyl chloride microparticles can be present in the polymer matrix of thermoset or thermoplastic polymer in weight percent amounts ranging from about the minimum necessary to lower the specific gravity of the polymer article or apparatus to the specific gravity so desired by the person having ordinary skill in the art. Without undue experimentation, that person can formulate a compound to have a sufficient mass of the hollow polyvinyl chloride microparticles to achieve the desired specific gravity for the overall compound. For example, hollow polyvinyl chloride microspheres can be present in the polymeric article or apparatus in an amount ranging from about 1% to about 30% and preferably from about 5% to about 20% weight percent of the total polymer compound formulation for forming into that article or apparatus.

Final shaping of the compound into a polymer article or apparatus can be any shaping technique known to those having ordinary skill in the art of polymer manufacturing and can be selected from the group consisting of extrusion, molding, spinning, casting, thermoforming, calendering, or 3D printing, with the proviso that the microparticles should not be exposed to temperatures of 212° F. (100° C.) or greater in order for the microparticles to retain their morphology of PVC shells having hollow cores and a volumetric density of from 0.2 or less to less than 0.6 g/cm$^3$, desirably from about 0.2 or less to about 0.5 g/cm$^3$, and preferably up to less than 0.4 g/cm$^3$.

Usefulness of the Invention

Using a direct comparison test, with all other parameters constant, the value of this invention can be emphasized.

Three different polymeric articles were cast at a temperature of about 68° F. (20° C.) for a duration of about 10 minutes. The first polymeric article consisted of a two-part urethane casting resin comprising Amazing Casting Resin (also sold as Alumilite™ White by Alumilite Corporation) as a matrix, to serve as the control. The second polymeric article consisted of that two-part urethane casting resin with the addition of 12 grams of Vestolit G215 PVC Blending Resin (having a measured volumetric density of 0.75 g/cm$^3$) for every 60 mL of casting resin. The third polymeric article consisted of that two-part urethane casting resin with the addition of 12 grams of hollow PVC microparticles made according to Example 6 above (having a measured volumetric density of 0.31 g/cm$^3$) for every 60 mL of casting resin. All other parameters were held constant.

The polymeric article without any PVC added had a density of 1.02 g/cm$^3$. The polymeric article with commercial PVC blending resin added had a density of 1.00 g/cm$^3$. The polymeric article with PVC microparticles had a density of 0.87 g/cm$^3$. Changing the PVC content from a blending resin to microparticles in this one test showed a 13% reduction in density, all other variables constant. Densities of the three polymeric articles were calculated by measuring the mass of each polymeric article divided by its volume, with volume measured by water displacement.

The invention is not limited to the above embodiments. The claims follow.

What is claimed is:

1. A composition of matter comprising hollow polymer microparticles with a Dn average particle size in their largest dimension ranging from about 15 to about 200 micrometers comprising polyvinyl chloride and having a volumetric density of less than about 0.6 g/cm$^3$, wherein the polymer microparticles have a polyvinyl chloride shell and a hollow core.

2. The composition polymer microparticles of claim 1, wherein the polymer microparticles are is formed from ingredients comprising:
   (a) from about 90 to about 100 parts per hundred monomer (PHR) of vinyl chloride monomer;
   (b) from about 0.05 to about 0.2 PHR of an initiator;
   (c) from about 1.0 to about 2.0 PHR of one or more lipophilic surfactants;
   (d) from about 0 to about 0.07 PHR of sodium hydroxide;
   (e) from about 10 to about 20 PHR of water;
   (f) from about 1.7 to about 3.2 PHR of one or more hydrophilic surfactants; and
   (g) from about 2 to about 10 PHR of a crosslinker.

3. The composition of claim 1, wherein the polymer microparticles are formed from ingredients comprising:
   (a) from about 90 to about 100 parts per hundred monomer (PHR) of vinyl chloride monomer;
   (b) from about 0.05 to about 0.2 PHR of peroxide initiator;
   (c) from about 0.4 to about 0.5 PHR of epoxidized oil lipophilic surfactant;
   (d) from about 0.9 to about 1.1 PHR of adipate lipophilic surfactant;
   (e) from about 10 to about 20 PHR of water;
   (f) from about 1.7 to about 3.2 PHR of polyvinyl alcohol hydrophilic surfactant(s); and
   (g) from about 2 to about 10 PHR of crosslinker.

4. The composition of claim 3, wherein the ingredients (a)-(e) and optionally ingredient (g) form an intermediate water-in-oil emulsion of ingredient (e) dispersed in a continuous phase of ingredients (a)-(d) and optionally ingredient (g).

5. The composition of claim 4, wherein the intermediate forms a dispersed oil phase in an aqueous phase comprising ingredients (e) and (f) if ingredient (g) is not in the intermediate.

6. The composition of claim 5, wherein the polymer microparticles, after polymerization of the intermediate in the aqueous phase and removal of the aqueous phase and ingredient (e), have a morphology of the polyvinyl chloride shell surrounding the hollow core.

7. The composition of claim 1, wherein the polymer microparticles are dispersed in a polymer matrix or an inorganic compound and reduce the specific gravity of the polymer matrix or the inorganic compound, respectively.

8. The composition of claim 7, wherein the polymer matrix is selected from the group consisting of thermoplastic and thermoset polymers.

9. The composition of claim 8, wherein the polymer microparticles have a volumetric density of less than 0.4g/cm$^3$; and
wherein the matrix further comprises at least one additive selected from the group consisting of adhesion promoters; biocides; anti-fogging agents; anti-static agents; bonding, blowing and foaming agents; colorants, dyes, and pigments;
dispersants; fillers and extenders; fire and flame retardants and smoke suppressants;
impact modifiers; initiators; lubricants; micas; plasticizers; processing aids; release agents; silanes, titanates and zirconates; slip and anti-blocking agents; stabilizers;
stearates; ultraviolet light absorbers; viscosity regulators; waxes; and combinations of them.

10. The composition of claim 1, wherein the Dn average particle size in their largest dimension is at least about 22 micrometers.

11. The composition of claim 1, wherein the Dn average particle size in their largest dimension is at least about 30 micrometers.

12. A method of polymerizing monomers and mixing ingredients to form polymer microparticles, comprising a double emulsion polymerization process comprising the following steps:
(a) forming an intermediate water-in-oil emulsion having a discontinuous phase of alkaline water in a continuous phase of vinyl chloride monomer and lipophilic surfactant(s) and initiator(s) and optionally crosslinker(s),
(b) mixing the intermediate premixed water-in-oil emulsion into an aqueous phase, optionally alkaline, containing hydrophilic surfactants, such that the intermediate premixed water-in-oil emulsion becomes a discontinuous oil phase in the aqueous phase,
(c) ripening via agitation the double emulsion to form the microparticles having a vinyl chloride monomeric shell and an aqueous core,
(d) polymerizing with the addition of crosslinker(s) if not added in step (a) the vinyl chloride monomeric shell, and
(e) drying the polymer microparticles to remove water from their cores thereby forming hollow polymer microparticles with a Dn average particle size in the largest dimensions ranging from about 15 to about 200 micrometers and having a volumetric density of less than about 0.6 g/cm$^3$, wherein the polymer microparticles have a polyvinyl chloride shell and a hollow core.

13. The method of claim 12, wherein the ripening step (c) ranges from about 30 to about 120 minutes and wherein the temperature of polymerizing step (d) ranges from about 125° F. to about 140° F.

14. The method of claim 13, wherein polymer microparticles are formed from ingredients comprising:
(a) from about 90 to about 100 parts per hundred monomer (PHR) of vinyl chloride monomer;
(b) from about 0.05 to about 0.2 PHR of an initiator;
(c) from about 1.0 to about 2.0 PHR of one or more lipophilic surfactants;
(d) from about 0 to about 0.07 PHR of sodium hydroxide;
(e) from about 10 to about 20 PHR of water;
(f) from about 1.7 to about 3.2 PHR of one or more hydrophilic surfactants; and
(g) from about 2 to about 10 PHR of a crosslinker.

15. The method of claim 13, wherein polymer microparticles are formed from ingredients comprising:
(a) from about 90 to about 99 parts per hundred monomer (PHR) of vinyl chloride monomer;
(b) from about 0.05 to about 0.2 PHR of peroxide initiator;
(c) from about 0.4 to about 0.5 PHR of epoxidized oil lipophilic surfactant;
(d) from about 0.9 to about 1.1 PHR of adipate lipophilic surfactant;
(e) from about 10 to about 20 PHR of water;
(f) from about 1.7 to about 3.2 PHR of polyvinyl alcohol hydrophilic surfactant(s); and
(g) from about 2 to about 10 PHR of crosslinker.

16. The method of claim 14, wherein the ingredients (a)-(e) and optionally ingredient (g) form the intermediate water-in-oil emulsion of ingredient (e) dispersed in a continuous phase of ingredients (a)-(d) and optionally ingredient (g).

17. The method of claim 16, wherein the intermediate water-in-oil emulsions forms a dispersed oil phase in an aqueous phase comprising ingredients (e) and (f) if ingredient (g) is not in the intermediate.

18. The method of claim 17, wherein the polymer microparticles, after polymerization of the intermediate in the aqueous phase and removal of the aqueous phase and ingredient (e), have a morphology of a polyvinyl chloride shell surrounding a hollow core.

* * * * *